United States Patent
Liu et al.

(10) Patent No.: US 12,474,245 B2
(45) Date of Patent: Nov. 18, 2025

(54) APPARATUS AND METHOD FOR MEASURING THE ELASTICITY OF MICROFIBERS AT HIGH THROUGHPUT

(71) Applicants: Versitech Limited, Hong Kong (CN); THE TRUSTEES OF PRINCETON UNIVERSITY, Princeton, NJ (US)

(72) Inventors: Yuan Liu, Hong Kong (CN); Anderson Ho Cheung Shum, Hong Kong (CN); Janine K. Nunes, Princeton, NJ (US); Howard A. Stone, Princeton, NJ (US)

(73) Assignees: Versitech Limited, Hong Kong (CN); The Trustees of Princeton University, Princeton, NJ (US)

( * ) Notice: Subject to any disclaimer, the term of this patent is extended or adjusted under 35 U.S.C. 154(b) by 368 days.

(21) Appl. No.: 18/336,266

(22) Filed: Jun. 16, 2023

(65) Prior Publication Data

US 2023/0417640 A1 Dec. 28, 2023

Related U.S. Application Data

(60) Provisional application No. 63/367,173, filed on Jun. 28, 2022.

(51) Int. Cl.
*G01N 3/06* (2006.01)
*G01N 3/08* (2006.01)

(52) U.S. Cl.
CPC .............. *G01N 3/068* (2013.01); *G01N 3/08* (2013.01); *G01N 2203/0075* (2013.01)

(58) Field of Classification Search
CPC ............ G01N 3/08; G01N 3/068; G01N 3/26; G01N 2203/0075; G01N 2203/0019;

(Continued)

(56) References Cited

U.S. PATENT DOCUMENTS 11,105,791 B2    8/2021 Chou et al.

FOREIGN PATENT DOCUMENTS

| AU | 2021102459 A4 | 6/2021 |
| CA | 2 831 223 C | 4/2019 |

OTHER PUBLICATIONS

Kim et al., "Nanopottery: Coiling of Electrospun Polymer Nanofibers", Nano Lett. 2010, 10, 2138-2140, <https://pubs.acs.org/doi/10.1021/nl100824d> (Year: 2010).*

(Continued)

*Primary Examiner* — Jonathan M Dunlap
(74) *Attorney, Agent, or Firm* — SALIWANCHIK, LLOYD & EISENSCHENK

(57) ABSTRACT

The subject invention pertains to a new method for measuring the elastic properties of microfibers by rope-coiling. Rope-coiling refers to the buckling of a slender elastic fiber caused by axial compression. A continuous flow microfluidic method enables the high-throughput measurement of the elasticity of microfibers by rope-coiling, where sample loading and unloading are not needed between consecutive measurements. In certain embodiments the coiling radius can be directly proportional to the elastic modulus of the fiber, facilitating calibration to measure fiber elasticity for high-throughput applications. Throughput can be thousands of times higher than that of a tensile tester, making possible an in situ, on-line measurement in a microfluidic production line, which couples the making of microfibers and the measurement of elasticity on the same line. The new method can also measure certain fibers with local variations in elasticity.

32 Claims, 14 Drawing Sheets

(58) Field of Classification Search
CPC ..... G01N 2203/028; G01N 2203/0298; G01N 2203/0682; G01N 33/365
See application file for complete search history.

(56) References Cited

OTHER PUBLICATIONS

European Search Report dated Nov. 7, 2023 in European Application No. 23180115.0.
Nie, M., et al., "Microfluidics based synthesis of coiled hydrogel microfibers with flexible shape and dimension control," Sensors and Actuators B: Chemical, 2017, 246:358-362.
Luelf, T., et al., "Rope coiling spinning of curled and meandering hollow-fiber membranes," Journal of Membrane Science, 2016, 506:86-94.
Trofimov, A., et al., "Effect of elastic contrast on the contribution of helical fibers into overall stiffness of a composites," International Journal of Engineering Science, 2017, 120:31-50.
Chen, X., et al., "Vapor phase preparation of super-elastic carbon micro-coils," Journal of Crystal Growth, 2002, 237-239:1931-1963.
Alsteens, D., et al., "Multiparametric atomic force microscopy imaging of single bacteriophages extruding from living bacteria," Nature Communications, 2013, 4(2926):1-7.
Amir, A., et al., "Bending forces plastically deform growing bacterial cell walls," PNAS, 2014, 111(16):5778-5783.
Barnes, G., et al. ,"Liquid Rope-Coil Effect," American Journal of Physics, 1958, 26(4):1-6.
Boulbitch, A., et al., "Elasticity of the Rod-Shaped Gram-Negative Eubacteria," Physical Review Letters, 2000, 85(24):5246-5249.
Bustamante, C., et al., "Ten years of tension: single-molecule DNA mechanics," Nature, 2003, 421:423-427.
Cubaud, T., et al., "Folding of Viscous Threads in Diverging Microchannels," Physical Review Letters, 2006, 96(114501):1-4.

Demczyk, B.G., et al., "Direct mechanical measurement of the tensile strength and elastic modulus of multiwalled carbon nanotubes," Materials Science and Engineering, 2002, A334:173-178.
Du Roure, O., et al., "Dynamics of Flexible Fibers in Viscous Flows and Fluids," Annual Review of Fluid Mechanics, 2019, 51:1-36.
Duprat, C., et al., "Microfluidic in situ mechanical testing of photopolymerized gels," Lab on a Chip, 2015, 15:244-252.
Guo, J., et al., "Highly Stretchable, Strain Sensing Hydrogel Optical Fibers," Advanced Materials, 2016, 28:10244-10249.
Haase, M.F., et al., "In Situ Mechanical Testing of Nanostructured Bijel Fibers," ACS Nano, 2016, 10:6338-6344.
Kojima, H., et al., "Direct measurement of stiffness of single actin filaments with and without tropomyosin by in vitro nanomanipulation," Proc. Natl. Acad. Sci. USA, 1994, 91:12962-12966.
Nunes, J.K., et al., "Microfluidic tailoring of the two-dimensional morphology of crimped microfibers," Soft Matter, 2013, 9:4227-4235.
Nunes, J.K., et al., "Electrostatic wrapping of a microfiber around a curved particle," Soft Matter, 2021, 17:3609-3618.
Poncharal, P., et al., "Electrostatic Deflections and Electromechanical Resonances of Carbon Nanotubes," Science, 1999, 283:1-5.
Ribe, N.M., et al., "Liquid Rope Coiling," 2012, Annu. Rev. Fluid Mech., 2012, 44:1-20.
Shao, L., et al., "Fiber-Based Mini Tissue with Morphology-Controllable GelMA Microfibers," Small, 2018, 14 (1802187):1-8.
Shon, M.J., et al., "Submicrometer elasticity of double-stranded DNA revealed by precision force-extension measurements with magnetic tweezers," Science Advances, 2019, 5:1-13.
Wyss, H.M., et al., "Capillary micromechanics: Measuring the elasticity of microscopic soft objects," Soft Matter, 2010, 6:4550-4555.
Xu, P., et al., "Bioinspired Microfibers with Embedded Perfusable Helical Channels," Advanced Materials, 2017, 29(1701664):1-7.
Yu, M.-F., et al., "Strength and Breaking Mechanism of Multiwalled Carbon Nanotubes Under Tensile Load," Science, 2000, 287:1-5.

* cited by examiner

APPARATUS AND METHOD FOR MEASURING THE ELASTICITY OF MICROFIBERS AT HIGH THROUGHPUT

CROSS-REFERENCE TO RELATED APPLICATION

This application claims the benefit of U.S. Provisional Application Ser. No. 63/367,173, filed Jun. 28, 2022, which is hereby incorporated by reference in its entirety including any tables, figures, or drawings.

BACKGROUND OF THE INVENTION

Elasticity is commonly measured by a tensile test: fixing one end of a sample, pulling the other end under a given load, and measuring the sample's deformation. Using similar ideas, the elasticities of tiny fragile fibers, such as DNA/RNA[1-3], filamentous bacteria[4,5], actin filaments[6], carbon nanotubes[7-9], and functional microfibers[10-12] can be measured by advanced equipment such as optical/magnetic tweezers[1,2], piezo actuators[6,9,11], atomic force microscopes[3,7], transmission electron microscopes[8,9], and microfluidic devices[5,10,12]. Recent technological advances have made gains in both sensitivity and accuracy (e.g., measurements on the order of ~pN in force and ~nm in displacement). The throughput, however, remains low and is impeded, for example, by the sample loading and unloading, which is time-consuming and skill-intensive as the fibers of research interest are commonly tiny and fragile.

BRIEF SUMMARY OF THE INVENTION

Embodiments of the subject invention can provide a simple microfluidic method and apparatus that measures the elasticity of microfibers (even at high throughput) by rope-coiling, such that sample loading and unloading are not needed between consecutive measurements. Rope-coiling refers to the buckling of a slender elastic fiber caused by axial compression[13]. Rope-coiling should not be confused with the coiling of viscous liquid threads[14-16], nor the subsequent solidification of the already coiled liquid threads[17,18]. Research interest in rope-coiling in liquid has emerged only recently with increasing microfluidic applications.

Without being bound by theory, the inventors expect that the coiling method can be applied to different kinds of samples, including but not limited to DNA, filamentous bacteria, cytoskeleton filaments, and carbon nanotubes, of which the challenges created by various small values of diameter can be overcome by embodiments of the subject invention.

As the inventors have shown, $R_{coil} \propto E\, d_{fiber}$, where $R_{coil}$ is the coiling radius of fiber, E is the elastic modulus and $d_{fiber}$ is fiber diameter, implies that the coiling radius of a soft but thick fiber can be similar to that of a stiff but thin fiber. In one experiment, the coiling has been demonstrated for very soft microfibers, with elastic moduli ~10 kPa and diameter ~100 μm. In contrast, for example, DNA can be quite stiff, with elastic modulus ~1 GPa and diameter ~1 nm, so that the resultant coiling radius can have the same order of magnitude. Furthermore, according to a scaling analysis $R_{coil} \propto (E\, d_{fiber})/\mu\, v_{fiber}$, where $v_{fiber}$ is injected velocity of fiber and $\mu$ is the viscosity of the surrounding liquid, embodiments can also modify the injected velocity, liquid viscosity, fiber diameter and channel size to adapt the setup for different samples. From the technical perspective, despite numerous challenges, there are successful examples in related art of manipulating, uncoiling, and imaging of DNA or actin filaments in micro/nanofluidic chips under an optical microscope. Embodiments of the subject invention advance beyond the related art by providing novel systems and methods for non-destructive measurement of nanofiber and microfiber mechanical properties (e.g., fiber elasticity). Non-destructive measurement means that the measured fiber is not destroyed to obtain the measurement, and includes but is not limited to rapid, non-contact (e.g., image based, light intensity, laser diffraction) measurement of rope-coiling parameters (e.g., coiling radius, the period, the pitch and velocity of coil). Rapid measurement means that the measurement can be obtained while maintaining the throughput of the manufacturing process to within an order of magnitude, and includes but is not limited to measurements wherein sample loading and unloading are not needed between consecutive measurements. Non-contact means that the measurement does not require physical contact with the measured fiber, and includes but is not limited to optical, laser, and light based measurements. Certain embodiments can provide real-time measurement and analysis leading to the identification, classification, sorting, or grouping of fibers during production. Certain embodiments can provide real-time measurement and analysis leading to process control and optimization of one or more fiber properties during production with requiring material reduction in fiber throughput to obtain the measurement.

It is contemplated within the scope of the subject invention that high-throughput measurements of fiber coiling radius according to embodiments of the subject invention can provide new or improved applications such as real-time screening or sorting by provided measurements of mechanical properties and real-time control of process parameters during the production of microfibers.

BRIEF DESCRIPTION OF THE DRAWINGS

In FIGS. 1D-1I, the experimental conditions are held constant: the injected velocity of fiber is 42 mm/s, the fiber diameter is 113 μm, and the half-width of the wide channel $R_0$ is 873 μm. The coiling radius data for each image is reported below and represented by the (orange, hollow, upward-pointing) triangle symbol data series ($v_{fiber}$=42 mm/s, $d_{fiber}$=113 μm, and $R_0$=873 μm) in FIGS. 2A and 2B. No coiling is observed for the liquid jet in FIG. 1D (where E is effectively zero). For the sample shown in FIG. 1E, E=2 kPa, $R_{coil}$=92 μm. For the sample shown in FIG. 1F, E=4.4 kPa, $R_{coil}$=142 μm. For the sample shown in FIG. 1G, E=5.6 kPa, $R_{coil}$=236 µm. For the sample shown in FIG. 1H, E=7.8 kPa, $R_{coil}$=335 µm. For the sample shown in FIG. 1I, E=10.7 kPa, $R_{coil}$=504 µm. The elastic moduli were measured by a tensile tester using methods known in the art. As the elasticity increases (from 2 to 6), the coiling radius increases correspondingly. The scale bar in FIG. 1D is 500 µm, and FIGS. 1D-1I are at approximately the same magnification.

DETAILED DISCLOSURE OF THE INVENTION

The subject invention can be better understood by reference to certain non-limiting exemplary embodiments and related definitions, as follows.

Embodiment 1. A system useful for high throughput elasticity measurement of microfibers, the system comprising:
a coiling device configured and adapted for operable connection to a fiber making device;
a coil measurement device configured and adapted to capture a coil radius ($R_{coil}$) measurement of a coil created by the coiling device; and
a coil measurement calibration device configured and adapted to convert $R_{coil}$ to a fiber elasticity value (E).

In certain embodiments, high throughput elasticity measurement of microfibers can be advantageously applied to continuous or semi-continuous production of a fiber or fibers (e.g., between 50 µm and 500 µm diameter, or larger or smaller, including any fiber that can be rope-coiled) at a measurement rate greater than 1 measurement per minute (e.g., greater than 1 measurement per second, or faster or slower, including any rate at which the target fiber can be rope-coiled, measured, and optionally uncoiled in a commercially viable production process or measurement process), and at fiber throughput rate greater than 15 mm/sec, alternatively greater than 27 mm/s, alternatively greater than 40 mm/s, or faster or slower, including any rate at which the target fiber can be rope-coiled, measured, and optionally uncoiled in a commercially viable production process or measurement process.

Figure 1A:
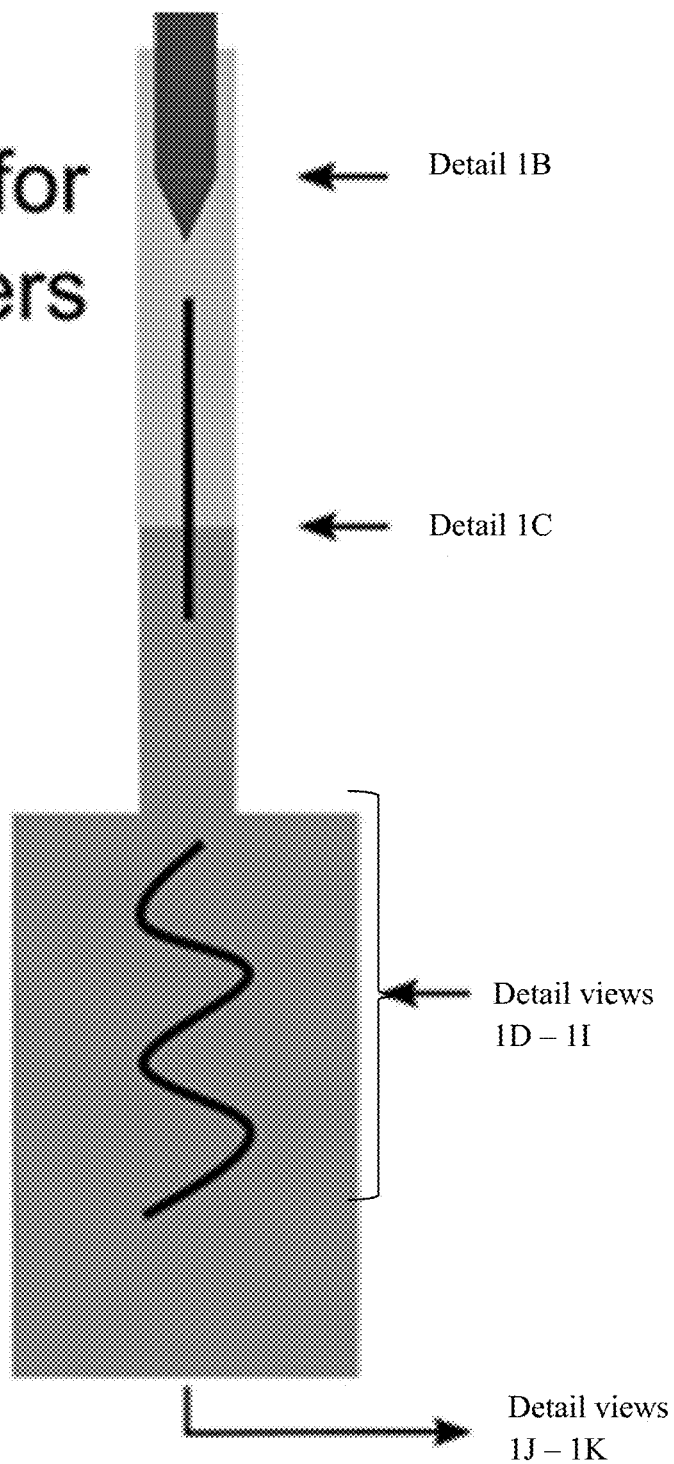
FIG. 1A shows a schematic drawing of a setup for coiling microfibers according to an embodiment of the subject invention which comprises a device for making fibers and a coiling device, whereby microfibers with different diameters, elasticities, and injection speeds can be produced. The locations of detailed views 1B through 1K are schematically represented.

In certain embodiments a coiling device can include two channels (e.g., glass capillaries) selected to form a small channel upstream and a wide channel downstream as shown in FIG. 1A. In certain embodiments the width of the upstream channel is in the range of hundreds of microns, for example 560 µm has been tested successfully. Alternatively, the width of the upstream channel can be 100, 200, 300, 400, 500, 600, 700, 800, or 900 µm (or higher, depending on the fiber being measured), including increments, combinations, and ranges of any of the foregoing. In certain embodiments the width of the downstream channel is in the range of hundreds of microns, for example 1160 µm, 1746 µm, or 3500 µm have been tested successfully. Alternatively, the width of the downstream channel can be 1000, 1500, 2000, 2500, 3000, 3500, 4000, 4500, or 5000 µm (or higher in certain embodiments, depending on the fiber being measured), including increments, combinations, and ranges of any of the foregoing. In certain embodiments the ratio of the width of the upstream channel to the width of the downstream channel is in the range of about 1:2 to about 1:6, for example 560/1160 (about 1:2, or about 0.48), 560/1746 (about 1:3, or about 0.32), and 560/3500 (about 1:6, or about 0.16) have been tested successfully. Alternatively, the ratio of the width of the upstream channel to the width of the downstream channel can be 0.6, 0.5, 0.4, 0.3, or 0.2 (or in certain embodiments either higher or lower, depending on the fiber being measured), including increments, combinations, and ranges of any of the foregoing. Suitable ratios include those low enough to produce the coiling effect in a fiber under measurement conditions while also large enough to remain practical and commercially viable. From a practical perspective, for a given size fiber extruded or passed through a given size upstream channel, one of ordinary skill in the art can, by the teachings of the subject invention, select an appropriate size downstream channel to provide sufficient change in width to produce the coiling effect and allow for the expected coiling and measurement of the fiber.

In certain embodiments a coil measurement device can include optical and/or microfluidic measurement devices, or other devices capable of delivering measurements in the range of seconds, for example 1 measurement in less than 60 seconds, alternatively less than 45, 30, 20, 10, 5, 3, 2, or 1 second per measurement or greater than 1, 2, 3, 5, or 10 measurements per second, including increments, combinations, and ranges of any of the foregoing. A coil measurement device cannot include conventional fiber measurement devices (or techniques, methods, or procedures) requiring more than 1 minute per measurement.

A coil measurement calibration device can include a physical, digital, or logical lookup table, calibration curve, or equation.

Embodiment 2. The system of Embodiment 1, wherein the coiling device is configured and adapted to receive a flow of a process fluid and a movement of a fiber from a connected fiber making device through an upstream portion to a downstream portion; the coiling device comprising a first capillary forming a small channel in the upstream portion and a second capillary forming a wide channel in the downstream portion.

Embodiment 3. The system of Embodiment 2, wherein the second capillary is connected to and abruptly enlarged from the first capillary. Abruptly enlarged can include the first capillary being joined at an end of, protruded inside, or connected to the second capillary, and can include a positive, negative, zero, flat, continuous, discontinuous, constant, or variable slope measured in the direction of travel of the fiber. In some embodiments the first capillary has an inner diameter about equal to a diameter of a subject fiber (with or without an allowance for a specified radius or diameter of process fluid surrounding the fiber) and an outer diameter about equal to an inner diameter of the second capillary. In other embodiments the first capillary has an outer diameter smaller than an inner diameter of the second capillary. In alternative embodiments the first capillary has an outer diameter larger than an inner diameter of the second capillary. Certain embodiments provide structures as known in the art of rope-coiling fibers, as herein disclosed, or as may be later developed, suitable to produce rope-coiling sufficient to practice the subject invention.

Embodiment 4. The system of Embodiment 3, wherein the first capillary is configured and adapted to approximate the flow of the process fluid and the movement of the fiber from the connected fiber making device, and the second capillary is configured and adapted to create a condition of axial compression in the fiber sufficient to induce coiling under specified conditions as known in the art of rope-coiling fibers, as herein disclosed, or as may be later developed, and to form the fiber into a coiled fiber.

Embodiment 5. The system of Embodiment 1, wherein the coil measurement device is a non-destructive measurement device.

Embodiment 6. The system of Embodiment 5, wherein the coil measurement device is a non-contact measurement device.

Embodiment 7. The system of Embodiment 6, wherein the coil measurement device is an image based measurement device.

Embodiment 8. The system of Embodiment 5, wherein the coil measurement device is a real time measurement device.

Embodiment 9. The system of Embodiment 1, wherein the coil measurement calibration device is configured and adapted to convert $R_{coil}$ to E based on a linear relationship between $R_{coil}$ and E.

Embodiment 10. The system of Embodiment 9, wherein the linear relationship comprises a slope determined according to $R_{coil}$ of the coiled fiber.

Embodiment 11. A method useful for high throughput elasticity measurement of microfibers, the method comprising the following steps:
producing a microfiber having an elastic modulus (E) at a throughput greater than 1 mm/second;
coiling the microfiber to create a coiled microfiber having a coil radius ($R_{coil}$);
recording a measurement of $R_{coil}$;
calculating E from $R_{coil}$; and
uncoiling the microfiber.

Embodiment 12. The method of Embodiment 11, wherein the measurement is a non-destructive, non-contact, real-time, in-situ measurement.

Embodiment 13A. The method of Embodiment 11, wherein the measurement is an optical measurement.

Embodiment 13B. The method of Embodiment 11, wherein the measurement is a microfluidic measurement, or comprises a microfluidic technique.

Embodiment 14. The method of Embodiment 13A or Embodiment 13B, wherein the throughput is greater than the throughput of a tensile tester.

Embodiment 15. The method of Embodiment 14, wherein the throughput is greater than 1 fiber measured per minute, or optionally, greater than 1 fiber measured per second.

Embodiment 16. The method of Embodiment 12, wherein the steps of recording a measurement of $R_{coil}$ and calculating E from $R_{coil}$ are repeated at least 1 time per second.

Embodiment 17. The method of Embodiment 16, wherein the steps of recording a measurement of $R_{coil}$ and calculating E from $R_{coil}$ are repeated at least 2 times per second.

Embodiment 18. The method of Embodiment 12, wherein the step of calculating E from $R_{coil}$ comprises application of a linear relationship between E and $R_{coil}$.

Embodiment 19. The method of Embodiment 12, comprising the step of uncoiling the fiber after recording the measurement to produce a straight fiber, the mean radius of curvature of the fiber is about 10 mm, which is much larger than the coiling radius 0.1-0.5 mm.

Embodiment 20. A system useful for high throughput elasticity measurement of microfibers, the system comprising:
a coiling device configured and adapted for operable connection to a fiber making device;
a coil measurement device configured and adapted to capture a coil radius ($R_{coil}$) measurement of a coil created by the coiling device;
a coil measurement calibration device configured and adapted to convert $R_{coil}$ to a fiber elasticity value (E);
wherein the coiling device is configured and adapted to receive a flow of a process fluid and a movement of a fiber from a connected fiber making device through an upstream portion to a downstream portion, the coiling device comprising a first capillary forming a small channel in the upstream portion and a second capillary forming a wide channel in the downstream portion;
wherein the second capillary is connected to and abruptly enlarged from the first capillary;
wherein the first capillary is configured and adapted to approximate the flow of the process fluid and the movement of the fiber from the connected fiber making device, and the second capillary is configured and adapted to create a condition of axial compression in the fiber sufficient to induce coiling under specified conditions and to form the fiber into a coiled fiber;
wherein the coil measurement device is a non-destructive, non-contact, image based, real time measurement device;
wherein the coil measurement calibration device is configured and adapted to convert $R_{coil}$ to E based on a linear relationship between $R_{coil}$ and E; and
wherein the linear relationship comprises a slope determined according to $R_{coil}$ of the coiled fiber.

Embodiment 21. A system useful for high throughput elasticity measurement of a target microfiber, the system comprising:
a rope-coiling device configured and adapted to induce rope-coiling in the target microfiber, thereby creating a coiled microfiber;
a measurement device configured and adapted to measure one or more physical properties of the coiled microfiber within the rope-coiling device, thereby creating a coiled microfiber measurement; and
a calibration device configured and adapted to convert the coiled microfiber measurement to a microfiber elasticity measurement.

Embodiment 22. The system of Embodiment 21, wherein the measurement device is a microfluidic measurement device.

Embodiment 23. The system of Embodiment 22, wherein the calibration device comprises a calibration curve, calibration formula, or calibration table.

Embodiment 24. The system of Embodiment 23, wherein the rope-coiling device is a microfluidic device.

Embodiment 25. The system of Embodiment 24, wherein the coiled microfiber measurement comprises a rope-coiling radius, diameter, or velocity and the calibration device comprises a linear relationship between the rope-coiling radius, diameter, or velocity and the microfiber elasticity measurement.

Embodiment 26. A method useful for high throughput elasticity measurement of a target microfiber, the system comprising:

rope-coiling the target microfiber in a chamber, thereby creating a coiled microfiber;

measuring one or more physical properties of the coiled microfiber within the chamber, thereby creating a coiled microfiber measurement; and converting the coiled microfiber measurement to a microfiber elasticity measurement.

Embodiment 27. The method of Embodiment 26, wherein the measuring is done by a microfluidic measurement device.

Embodiment 28. The method of Embodiment 27, wherein the converting is done by reference to a calibration curve, calibration formula, or calibration table.

Embodiment 29. The method of Embodiment 28, wherein the chamber is a microfluidic device.

Embodiment 30. The method of Embodiment 29, wherein the coiled microfiber measurement comprises a rope-coiling radius, diameter, or velocity and the reference to a calibration curve, calibration formula, or calibration table comprises a linear relationship between the rope-coiling radius, diameter, or velocity and the microfiber elasticity measurement.

Embodiment 31. A microfluidic method useful for high throughput elasticity measurement of a target microfiber, the system comprising:

rope-coiling a solidified section of the target microfiber in a microfluidic chamber, thereby creating a coiled microfiber section;

measuring, by a microfluidic sensor, a coil radius of the coiled microfiber section within the chamber, thereby creating a coiled microfiber measurement;

converting the coiled microfiber measurement to a microfiber elasticity measurement; and uncoiling the coiled microfiber section.

Embodiment 32. A microfluidic system useful for high throughput elasticity measurement of a target microfiber, the system comprising:

a microfluidic rope-coiling device configured and adapted to induce rope-coiling in a section of the target microfiber, thereby creating a coiled microfiber section;

a microfluidic measurement device configured and adapted to measure a rope-coiling radius of the coiled microfiber section within the microfluidic rope-coiling device; and a calibration device configured and adapted to convert the rope-coiling radius to a microfiber elasticity measurement.

Figure 1B:
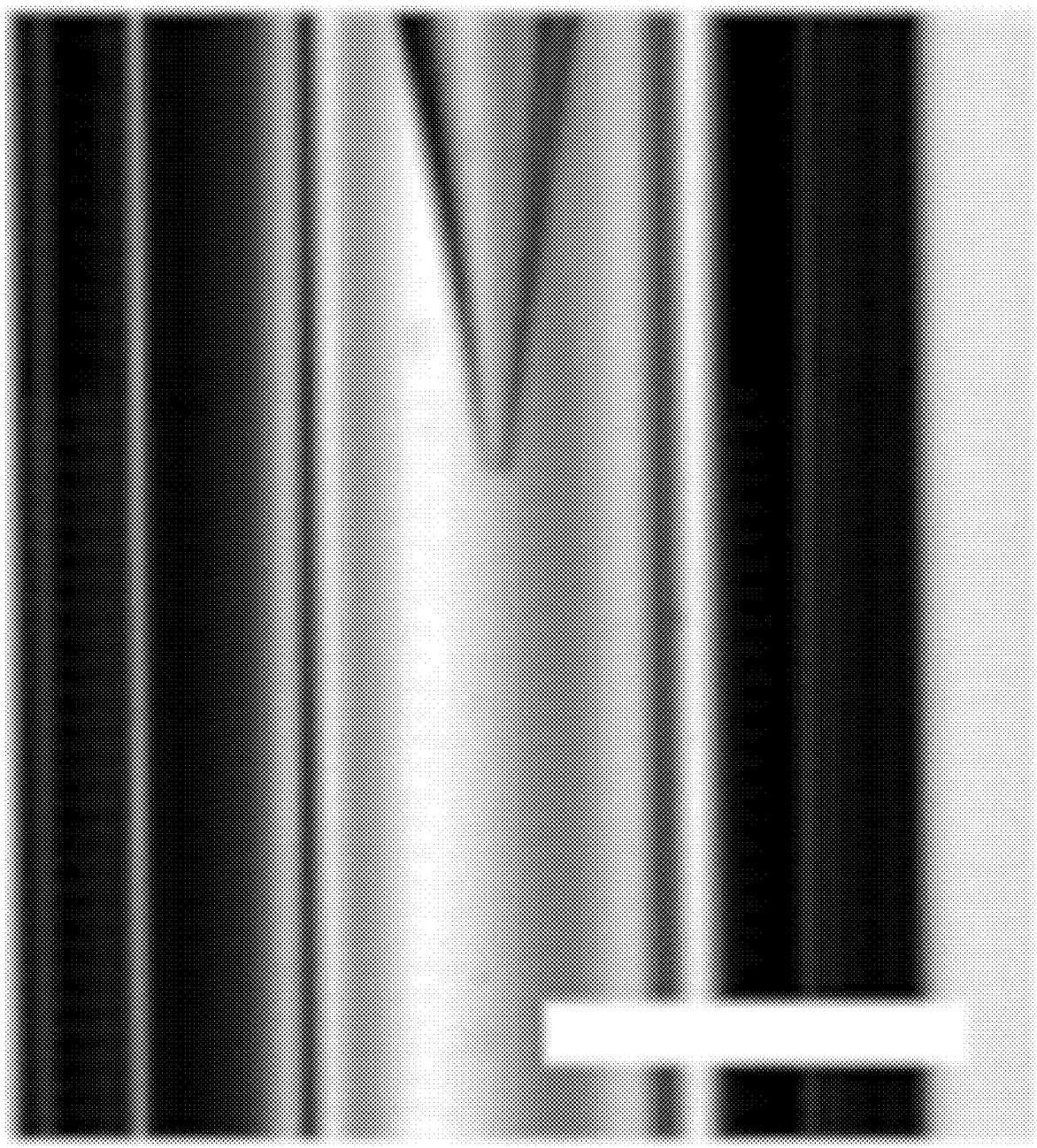
FIG. 1B shows an image of a co-flow device for making microfibers according to an embodiment of the subject invention. The scale bar in FIG. 1B is 500 μm.
Figure 1C:
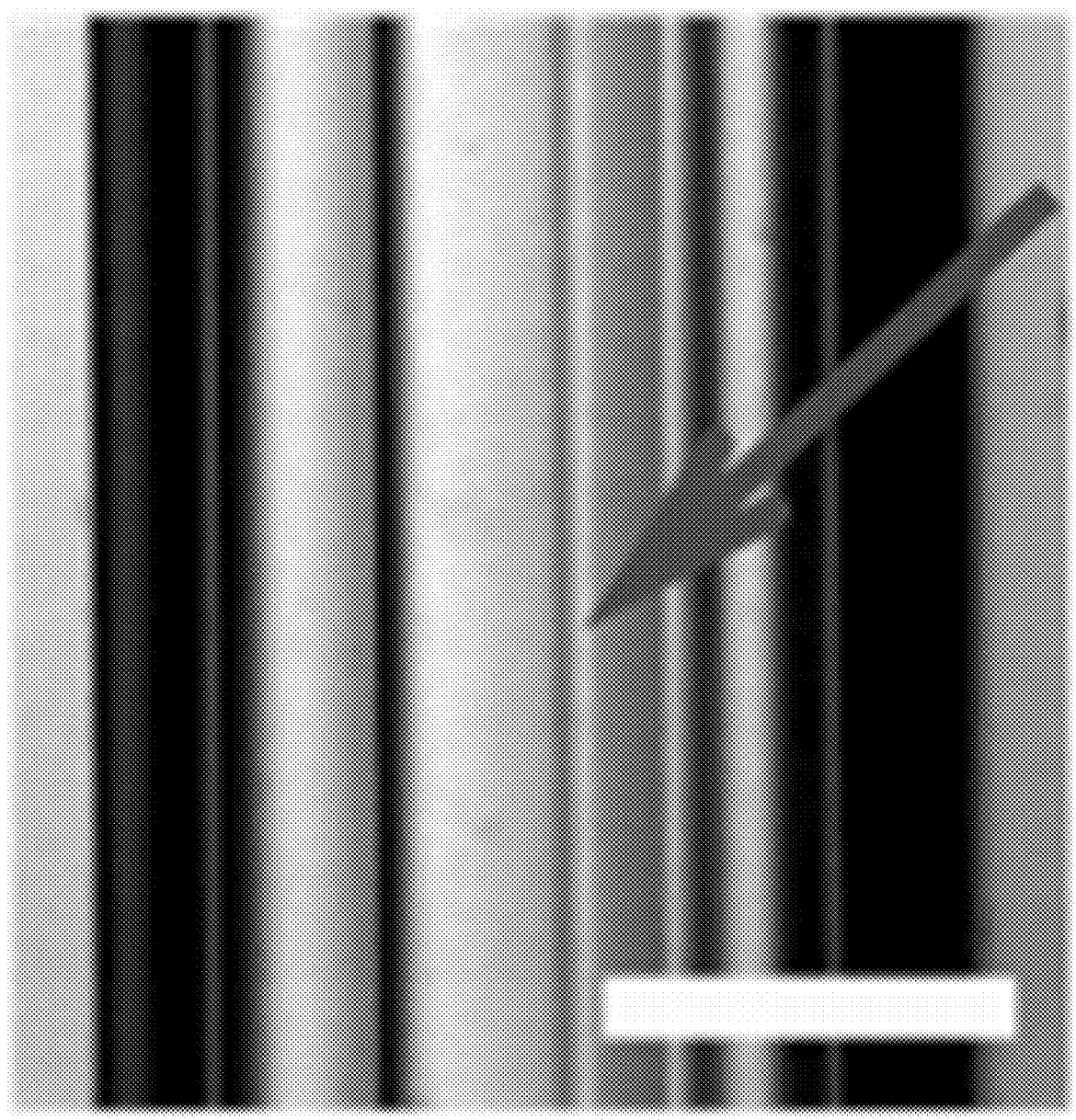
FIG. 1C is an image showing that the microfiber (indicated by the arrow) is straight before entering the wide channel in the coiling device according to an embodiment of the subject invention. The scale bar in FIG. 1C is 500 μm.
Figure 1D:
FIGS. 1D-1I are images showing coiling of microfibers with different elastic moduli, E, in a wide channel coiling device according to an embodiment of the subject invention. The images are recorded by a high-speed camera at 500 frames/second.
Figure 1E:
Figure 1F:
Figure 1G:
Figure 1H:
Figure 1I:

One embodiment is schematically illustrated in FIG. 1A, which comprises a device for making fibers and a coiling device. The device for making fibers can be a co-flow device, which comprises two coaxially aligned inlets made by a tapered inner capillary contained within an outer capillary, as shown in FIG. 1B. Microfibers can be produced by polymer crosslinking. For example, using an aqueous two-phase system (ATPS) as a model, the polymer-rich phase, which contains the photoinitiator, can be injected into the inner capillary, while the salt-rich phase can be injected into the outer capillary. A pulsed UV illumination polymerizes the aqueous jet into microfibers as shown in FIG. 1C, where the microfiber is straight before entering the wide channel in the coiling device. By controlling the reaction conditions precisely, microfibers with different diameters, elasticities, and injection speeds can be produced and evaluated according to the subject invention. Embodiments can measure the elastic moduli of microfibers by calibration to the real-time and non-contact measurement of coil radius. Embodiments have been tested and validated against destructive, expensive, and lower-throughput systems and methods are known in the art (e.g., a conventional tensile tester).

Figure 1J:
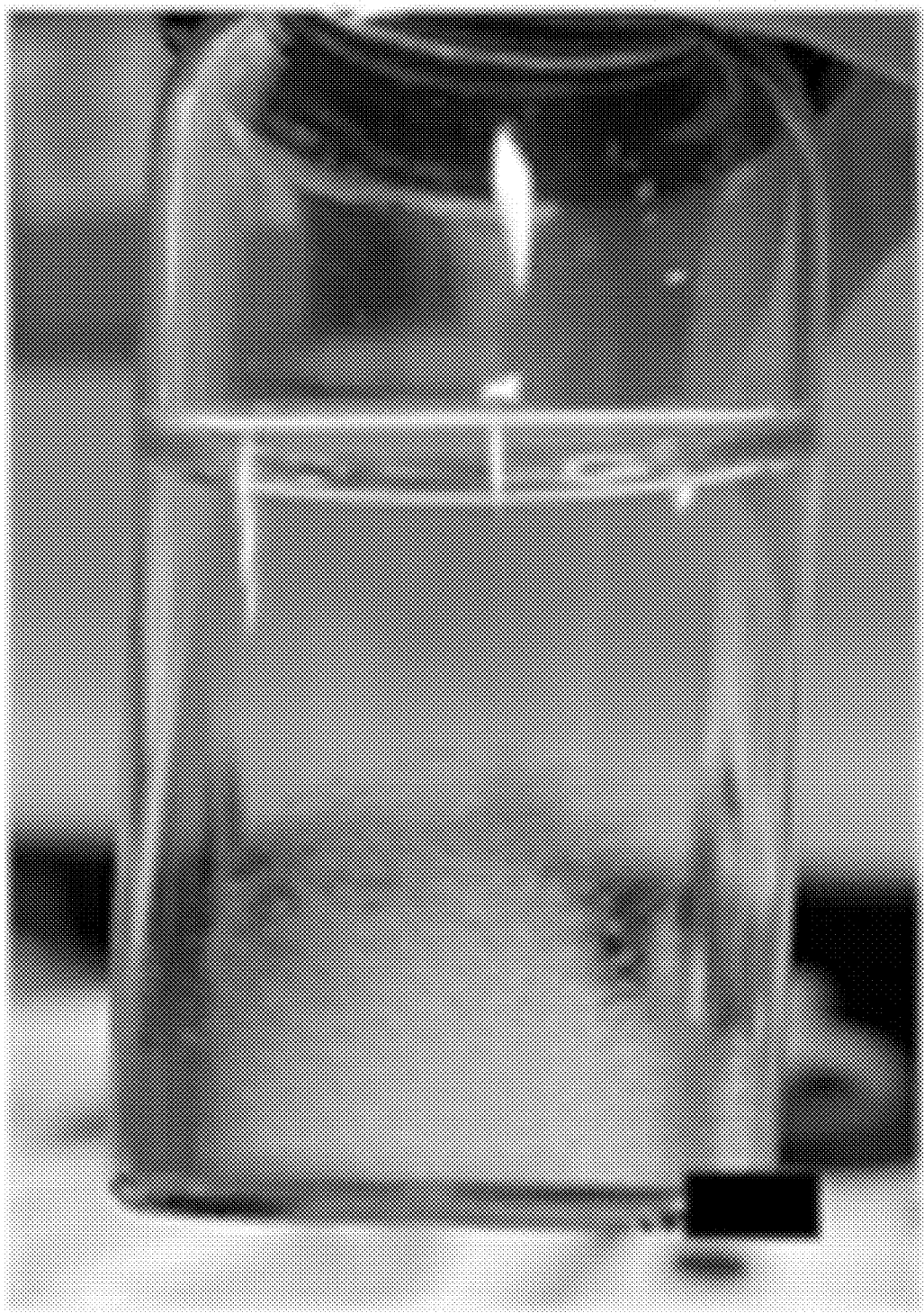
FIG. 1J is an image showing collected microfibers in water according to an embodiment of the subject invention. In this embodiment ~5000 microfibers are shown. The scale bar in FIG. 1J is 5 mm.
Figure 1K:
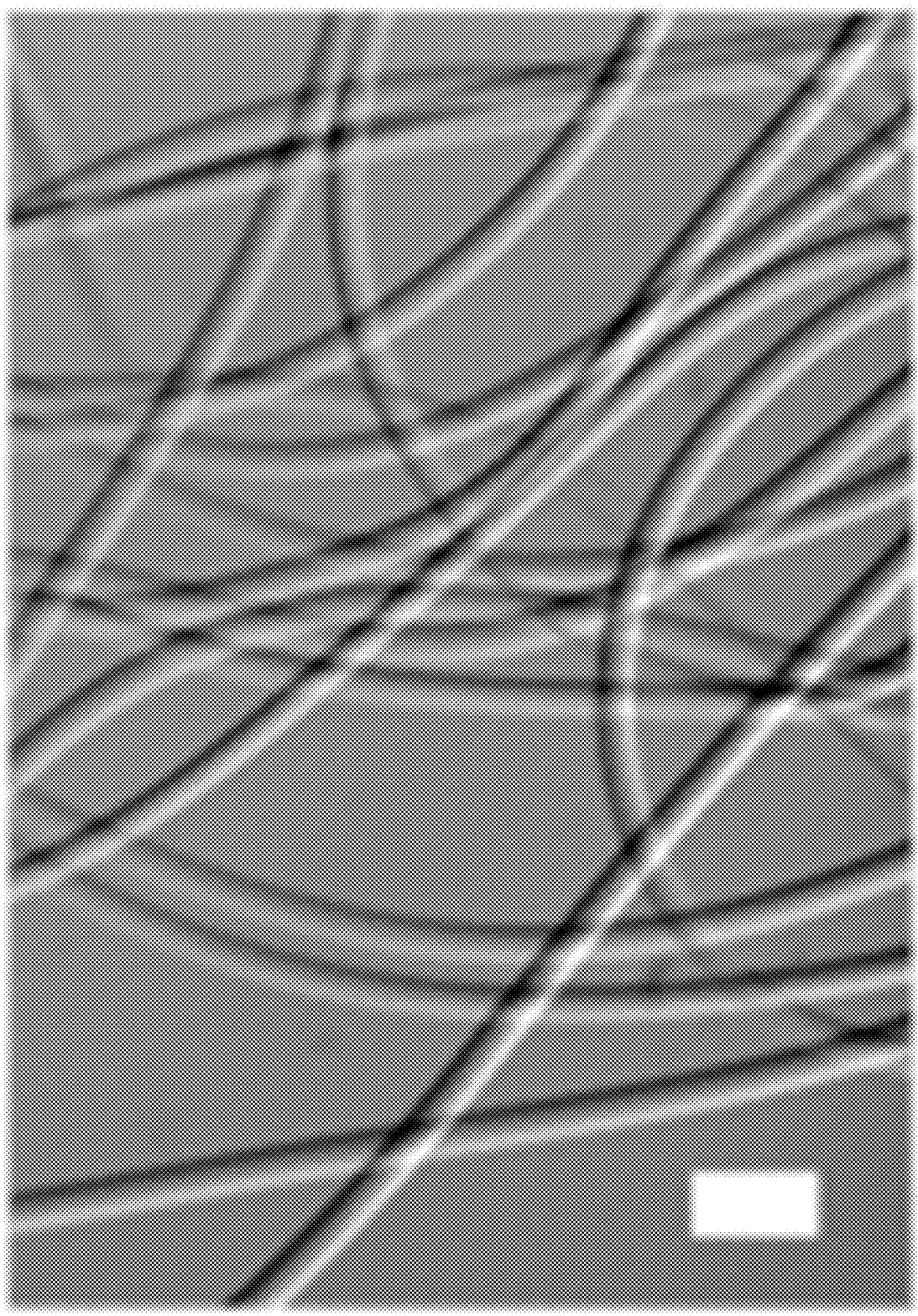
FIG. 1K is a microscope image of collected microfibers according to an embodiment of the subject invention. The microfibers are straight, despite their temporary coiling in the wide channel. The scale bar in FIG. 1K is 500 µm.

Coiling can occur spontaneously according to an embodiment of the subject invention when microfibers enter a wide channel in a coiling device, as shown in FIGS. 1D-1I. A coiling device according to an embodiment of the subject invention can be made by connecting two glass capillaries (including, for example, microfluidic structures comprising, approximating, or serving as capillaries) to form a small channel upstream and an abruptly enlarged wide channel downstream. The inventors have found that as the elasticity increases (e.g., moving from FIG. 1D, sequentially through FIGS. 1E, 1F, 1G, 1H, and 1I), the coiling radius increases correspondingly. It can be shown that the coiling radius is directly proportional to the elastic modulus of the fiber, and embodiments can advantageously use this relation to measure the elasticity for high-throughput applications. The coiling in the wide channel can be temporary; the collected microfibers are straight without curls at rest, as shown in FIG. 1J and FIG. 1K. This observation justifies that the microfibers have been solidified fully before coiling; otherwise, the elastic microfibers would have a curly shape at rest, as demonstrated in related art[19].

Figure 2A:
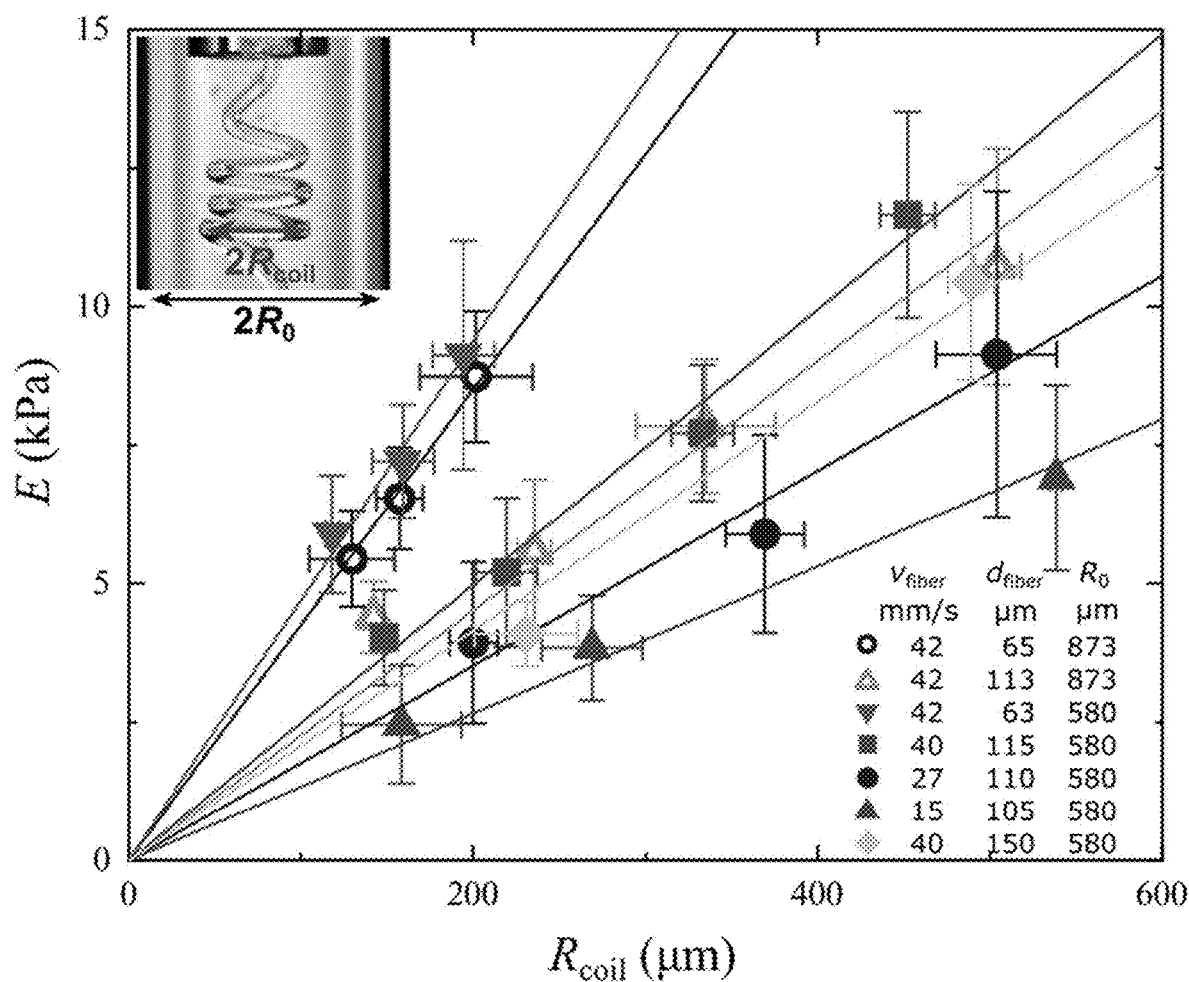
FIG. 2A shows a chart where elastic modulus, E, is plotted against coiling radius, $R_{coil}$, for seven sets of experimental conditions (shown in the legend in FIG. 2B), where $v_{fiber}$ is the injected velocity of fiber, $d_{fiber}$ is the fiber diameter, and $R_0$ is the half-width of the wide channel. Linear relations between elasticity and coiling radius are observed for all seven data groups. The solid lines are the best fits.
Figure 2B:
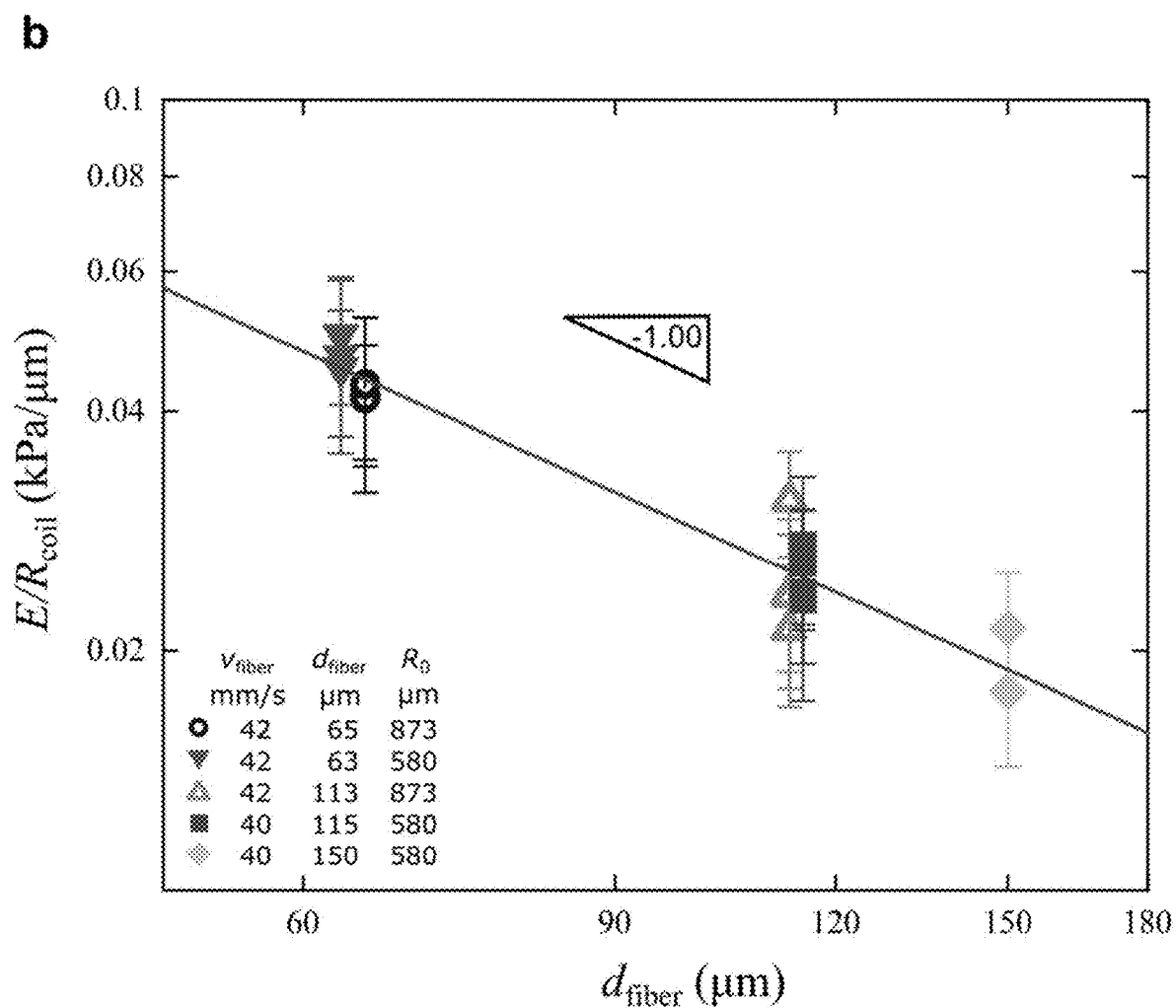
FIG. 2B shows a chart where the slope $E/R_{coil}$ is plotted against $d_{fiber}$ in log-log scale; the ratio of $E/R_{coil}$ decreases as $d_{fiber}$ increases. The exponent of the best fit (solid line) is $-1.00 \pm 0.08$.

Embodiments can analyze the relation between the elasticity and the coiling radius, as shown in FIGS. 2A-2B. These charts show the elastic modulus E and the corresponding coiling radius $R_{coil}$ for seven different sets of experimental conditions as shown in the legend of FIG. 2B: either the fiber velocity $v_{fiber}$, the fiber diameter $d_{fiber}$, or the half-width of the wide channel $R_0$ can be varied. Linear relations are observed in all seven data groups, as shown in FIG. 2A, where the solid lines are the best fits. The inventors have also determined that the slope $E/R_{coil}$ decreases as $d_{fiber}$ increases, as shown in FIG. 2B. The exponent of the best fit (solid line) is −1.00±0.08, which shows $R_{coil} \propto E\, d_{fiber}$. Therefore, with a proper calibration on the slope $E/R_{coil}$, embodiments can use the linear relation to measure the elasticity from the coiling radius in a continuous flow, high-throughput setting.

Coiling methods according to embodiments of the subject invention can have several advantages over conventional pulling methods for analyzing elastic properties of fibers. For example, the throughput of certain embodiments can be up to or more than tens, hundreds, or thousands of times higher than the comparable throughput of a tensile tester. This is at least in part because in the microfluidic device it takes only one second or less than one second to measure a single microfiber. To do the same measurement on a tensile tester, using related art methods, it takes 15 minutes to complete each measurement, in part due to the skill-intensive process of loading/unloading fragile samples. One important bottleneck of the pulling method can be (e.g., for tiny and/or fragile samples) the time-consuming and skill-intensive process of sample loading and unloading. Due to the high time and labor cost, the quality of the fibers can only be assessed statistically with sampling. In contrast, for the continuous flow coiling methods provided by embodiments of the subject invention, sample loading and unloading are not needed between consecutive measurements, so certain embodiments can measure the elasticity of every microfiber in real time (e.g., taking one measurement per second, or one measurement per minute, or faster or slower, as determined according to the stability of the fiber manufacturing process) by automatic video, image, or other sensor data analysis (e.g., by optical, microscopic, or microfluidic techniques). Alternative embodiments can measure select microfibers, can measure asynchronously or in parallel, and can measure by alternate sensors utilizing methods known in the art, herein disclosed, or later developed.

Additionally, the coiling method enables embodiments to achieve an in situ on-line measurement in a microfluidic production line, as demonstrated in FIGS. 1A-1K, which can couple the "making of microfibers" and the "measurement of elasticity" on the same process line. During or immediately after production, the elasticity of select fibers, or in certain embodiments the elasticity of every fiber, can be measured. Embodiments can screen defective fibers and use a feedback mechanism to correct a production fault or to tune a production process to avoid faults, improve throughput, increase quality, or optimize the process. For example, to maintain a constant elasticity, a decrease in coiling radius downstream could trigger an increase in UV intensity upstream.

Figure 3:
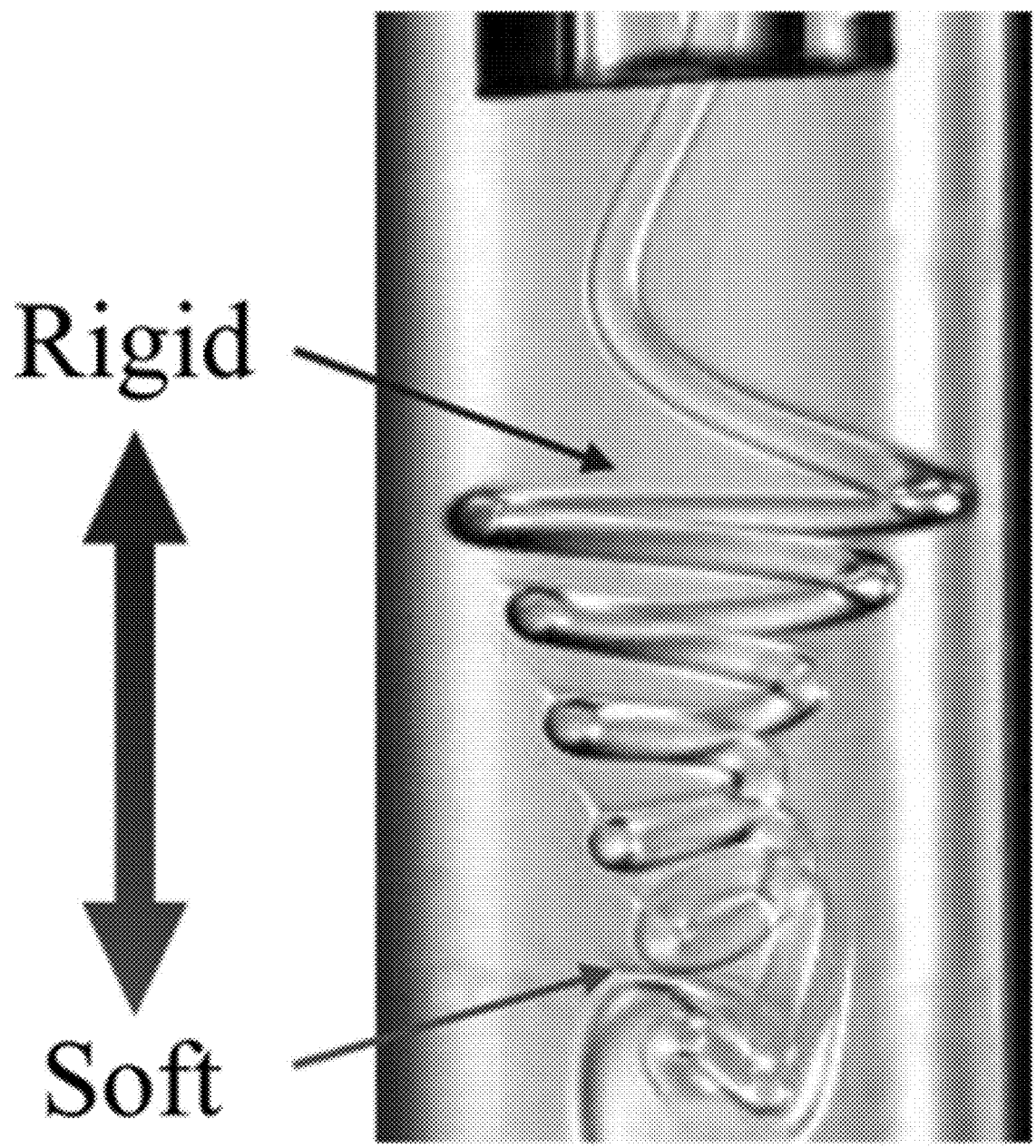
FIG. 3 shows the coiling of a fiber with graduated elasticity according to an embodiment of the subject invention. The stiff end E=13.2 kPa, the soft end E=4.0 kPa and the transition between stiff and soft is linear. The coiling radius is small at the soft end $R_{coil}$=175 µm, but large at the stiff end $R_{coil}$=600 µm, demonstrating the response to local elasticity variations.

Further, embodiments can measure the local elasticity of a segment with a spatial resolution on the order of the coiling radius rather than that of the whole fiber. This heterogeneity is demonstrated in FIG. 3, which shows the coiling of a fiber with graduated elasticity by changing the UV intensity over time. The inventors have demonstrated that the coiling radius can be small at the soft end, but large at the stiff end of a variable elasticity fiber. To achieve a comparable measurement of the variation of the elasticity by the conventional pulling method, it is necessary to cut a fiber into many pieces and measure each separately, which is an intrusive measurement and substantially increases the time and labor costs.

Materials and Methods

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

Example 1

Fabrication of Microfibers

The device for making fibers is a microfluidic co-flow device with pulsed UV illumination. The co-flow device consists of two coaxially aligned inlets made by a tapered inner circular capillary in an outer square capillary, as shown in FIG. 1A. The tapered capillary in FIG. 1B has an inner diameter of approximately 30 μm.

Microfibers are made of polyethylene glycol diacrylate (PEGDA) and can be cured by UV illumination. FIG. 1C shows a produced microfiber with a diameter of 65 μm. By adjusting the intensities of UV light (maximum intensity is 400 mW/cm$^2$), microfibers with different elasticities (2-10.7 kPa) are fabricated, as shown in FIGS. 1E-1I.

Example 2

Coiling of Microfibers

The coiling device is made by connecting two glass capillaries to form a small channel upstream and a wide channel downstream as shown in FIG. 1A. The width of the upstream channel is 560 μm. The width of the downstream channel is either 1160 μm, 1746 μm and 3500 μm in three different experiments respectively.

Coiling occurs when the microfibers enter the wide channel downstream, as shown in FIGS. 1E-1I. In an example shown in FIG. 1F, the diameter of the microfiber is 113 μm, the elasticity of the microfiber is 4.4 kPa, the injected velocity of microfiber is 42 mm/s, the width of the downstream channel is 1746 μm, and the resulting coiling radius $R_{coil}$ is 142 μm.

We also carry out experiments for different experimental conditions (fiber elasticities, fiber velocity, fiber diameter, and channel size) and measure the resulting coiling radius, as shown in FIG. 2A. The experimental results show that the coiling radius is linearly proportional to the elastic modulus of the fiber. The experimental results demonstrate that we can measure the elasticity of fibers by the coiling method.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Bustamante, C., Bryant, Z. & Smith, S. B. Ten years of tension: single-molecule DNA mechanics. Nature 421, 423-427 (2003).
2. Shon, M. J., Rah, S.-H. & Yoon, T.-Y. Submicrometer elasticity of double-stranded DNA revealed by precision force-extension measurements with magnetic tweezers. Sci. Adv. 5, eaav1697 (2019).
3. Alsteens, D., Trabelsi, H., Soumillion, P. & Dufrêne, Y. F. Multiparametric atomic force microscopy imaging of single bacteriophages extruding from living bacteria. Nat. Commun. 4, 2926 (2013).
4. Boulbitch, A., Quinn, B. & Pink, D. Elasticity of the Rod-Shaped Gram-Negative Eubacteria. Phys. Rev. Lett. 85, 5246-5249 (2000).
5. Amir, A., Babaeipour, F., McIntosh, D. B., Nelson, D. R. & Jun, S. Bending forces plastically deform growing bacterial cell walls. Proc. Natl. Acad. Sci. 111, 5778-5783 (2014).
6. Kojima, H., Ishijima, A. & Yanagida, T. Direct measurement of stiffness of single actin filaments with and without tropomyosin by in vitro nanomanipulation. Proc. Natl. Acad. Sci. 91, 12962-12966 (1994).

7. Yu, M.-F., Lourie, O., Dyer, M. J., Moloni, K., Kelly, T. F. & Ruoff, R. S. Strength and Breaking Mechanism of Multiwalled Carbon Nanotubes Under Tensile Load. Science 287, 637-640 (2000).
8. Poncharal, P., Wang, Z. L., Ugarte, D. & de Heer, W. A. Electrostatic Deflections and Electromechanical Resonances of Carbon Nanotubes. Science 283, 1513-1516 (1999).
9. Demczyk, B. G., Wang, Y. M., Cumings, J., Hetman, M., Han, W., Zettl, A. & Ritchie, R. O. Direct mechanical measurement of the tensile strength and elastic modulus of multiwalled carbon nanotubes. Mater. Sci. Eng. A 6 (2002).
10. Duprat, C., Berthet, H., Wexler, J. S., Du Roure, O. & Lindner, A. Microfluidic in situ mechanical testing of photopolymerized gels. Lab. Chip 15, 244-252 (2014).
11. Guo, J., Liu, X., Jiang, N., Yetisen, A. K., Yuk, H., Yang, C., Khademhosseini, A., Zhao, X. & Yun, S.-H. Highly Stretchable, Strain Sensing Hydrogel Optical Fibers. Adv. Mater. 28, 10244-10249 (2016).
12. Nunes, J. K., Li, J., Griffiths, I. M., Rallabandi, B., Man, J. & Stone, H. A. Electrostatic wrapping of a microfiber around a curved particle. Soft Matter 17, 3609-3618 (2021).
13. Du Roure, O., Lindner, A., Nazockdast, E. N. & Shelley, M. J. Dynamics of Flexible Fibers in Viscous Flows and Fluids. Annu. Rev. Fluid Mech. 51, 539-572 (2019).
14. Barnes, G. & Woodcock, R. Liquid Rope-Coil Effect. Am. J. Phys. 26, 205-209 (1958).
15. Cubaud, T. & Mason, T. G. Folding of Viscous Threads in Diverging Microchannels. Phys. Rev. Lett. 96, 114501 (2006).
16. Ribe, N. M., Habibi, M. & Bonn, D. Liquid Rope Coiling. Annu. Rev. Fluid Mech. 44, 249-266 (2012).
17. Xu, P., Xie, R., Liu, Y., Luo, G., Ding, M. & Liang, Q. Bioinspired Microfibers with Embedded Perfusable Helical Channels. Adv. Mater. 29, 1701664 (2017).
18. Shao, L., Gao, Q., Zhao, H., Xie, C., Fu, J., Liu, Z., Xiang, M. & He, Y. Fiber-Based Mini Tissue with Morphology-Controllable GelMA Microfibers. Small 14, 1802187 (2018).
19. Nunes, J. K., Constantin, H. & Stone, H. A. Microfluidic tailoring of the two-dimensional morphology of crimped microfibers. Soft Matter 9, 4227-4235 (2013).

We claim:

1. A system useful for high throughput elasticity measurement of microfibers, the system comprising:
 a coiling device configured and adapted for operable connection to a fiber making device;
 a coil measurement device configured and adapted to capture a coil radius ($R_{coil}$) measurement of a coil created by the coiling device; and
 a coil measurement calibration device configured and adapted to convert $R_{coil}$ to a fiber elasticity value (E).

2. The system of claim 1, wherein the coiling device is configured and adapted to receive a flow of a process fluid and a movement of a fiber from a connected fiber making device through an upstream portion to a downstream portion; the coiling device comprising a first capillary forming a small channel in the upstream portion and a second capillary forming a wide channel in the downstream portion.

3. The system of claim 2, wherein the second capillary is connected to and abruptly enlarged from the first capillary.

4. The system of claim 3, wherein the first capillary and the second capillary are each respectively configured and adapted such that together they create a condition of axial compression in the fiber sufficient to induce coiling under specified conditions and to form the fiber into a coiled fiber.

5. The system of claim 1, wherein the coil measurement device is a non-destructive measurement device.

6. The system of claim 5, wherein the coil measurement device is a non-contact measurement device.

7. The system of claim 6, wherein the coil measurement device is a microfluidics-based measurement device.

8. The system of claim 5, wherein the coil measurement device is a real time measurement device.

9. The system of claim 1, wherein the coil measurement calibration device is configured and adapted to convert $R_{coil}$ to E based on a linear relationship between $R_{coil}$ and E.

10. The system of claim 9, wherein the linear relationship comprises a slope determined according to $R_{coil}$ of the coiled fiber.

11. A method useful for high throughput elasticity measurement of microfibers, the method comprising:
 producing a microfiber having an elastic modulus (E) at a throughput greater than 1 mm per second;
 coiling the microfiber to create a coiled microfiber having a coil radius ($R_{coil}$);
 recording a measurement of $R_{coil}$;
 calculating E from $R_{coil}$; and
 uncoiling the coiled microfiber.

12. The method of claim 11, wherein the measurement is a non-destructive, non-contact, real-time measurement.

13. The method of claim 12, wherein the measurement is an optical measurement.

14. The method of claim 13, wherein the throughput is greater than 2 mm per second.

15. The method of claim 14, wherein the throughput is greater than 10 mm per second.

16. The method of claim 12, wherein the recording a measurement of $R_{coil}$ and calculating E from $R_{coil}$ are repeated at least once per minute.

17. The method of claim 16, wherein the recording a measurement of $R_{coil}$ and calculating E from $R_{coil}$ are repeated at least once per second.

18. The method of claim 12, wherein the calculating E from $R_{coil}$ comprises the application of a linear relationship between E and $R_{coil}$.

19. The method of claim 12, comprising the uncoiling the fiber after recording the measurement to produce a fiber that is straight and without coils.

20. A system useful for high throughput elasticity measurement of microfibers, the system comprising:
 a coiling device configured and adapted for operable connection to a fiber making device;
 a coil measurement device configured and adapted to capture a coil radius ($R_{coil}$) measurement of a coil created by the coiling device; and a coil measurement calibration device configured and adapted to convert $R_{coil}$ to a fiber elasticity value (E);
 wherein the coiling device is configured and adapted to receive a flow of a process fluid and a movement of a fiber from a connected fiber making device through an upstream portion to a downstream portion, the coiling device comprising a first capillary forming a small channel in the upstream portion and a second capillary forming a wide channel in the downstream portion;
 wherein the second capillary is connected to and abruptly enlarged from the first capillary;
 wherein the first capillary is configured and adapted to approximate the flow of the process fluid and the movement of the fiber from the connected fiber making device, and the second capillary is configured and adapted to create a condition of axial compression in the fiber sufficient to induce coiling under specified conditions and to form the fiber into a coiled fiber; and wherein the coil measurement device is a non-destructive, non-contact, image based, real time measurement device;

wherein the coil measurement calibration device is configured and adapted to convert $R_{coil}$ to E based on a linear relationship between $R_{coil}$ and E; and wherein the linear relationship comprises a slope determined according to $R_{coil}$ of the coiled fiber.

21. A system useful for high throughput elasticity measurement of a target microfiber, the system comprising:
a rope-coiling device configured and adapted to induce rope-coiling in the target microfiber, thereby creating a coiled microfiber;
a measurement device configured and adapted to measure one or more physical properties of the coiled microfiber within the rope-coiling device, thereby creating a coiled microfiber measurement; and
a calibration device configured and adapted to convert the coiled microfiber measurement to a microfiber elasticity measurement.

22. The system of claim 21, wherein the measurement device is a microfluidic measurement device.

23. The system of claim 22, wherein the calibration device comprises a calibration curve, calibration formula, or calibration table.

24. The system of claim 23, wherein the rope-coiling device is a microfluidic device.

25. The system of claim 24, wherein the coiled microfiber measurement comprises a rope-coiling radius, diameter, or velocity and the calibration device comprises a linear relationship between the rope-coiling radius, diameter, or velocity and the microfiber elasticity measurement.

26. A method useful for high throughput elasticity measurement of a target microfiber, the method comprising:
rope-coiling the target microfiber in a chamber, thereby creating a coiled microfiber;
measuring one or more physical properties of the coiled microfiber within the chamber, thereby creating a coiled microfiber measurement; and
converting the coiled microfiber measurement to a microfiber elasticity measurement.

27. The method of claim 26, wherein the measuring is done by a microfluidic measurement device.

28. The method of claim 27, wherein the converting is done by reference to a calibration curve, calibration formula, or calibration table.

29. The method of claim 28, wherein the chamber is a microfluidic device.

30. The method of claim 29, wherein the coiled microfiber measurement comprises a rope-coiling radius, diameter, or velocity and the reference to a calibration curve, calibration formula, or calibration table comprises a linear relationship between the rope-coiling radius, diameter, or velocity and the microfiber elasticity measurement.

31. A microfluidic method useful for high throughput elasticity measurement of a target microfiber, the method comprising:
rope-coiling a solidified section of the target microfiber in a microfluidic chamber, thereby creating a coiled microfiber section;
measuring, by a microfluidic sensor, a coil radius of the coiled microfiber section within the chamber, thereby creating a coiled microfiber measurement;
converting the coiled microfiber measurement to a microfiber elasticity measurement; and
uncoiling the coiled microfiber section.

32. A microfluidic system useful for high throughput elasticity measurement of a target microfiber, the system comprising:
a microfluidic rope-coiling device configured and adapted to induce rope-coiling in a section of the target microfiber, thereby creating a coiled microfiber section;
a microfluidic measurement device configured and adapted to measure a rope-coiling radius of the coiled microfiber section within the microfluidic rope-coiling device; and
a calibration device configured and adapted to convert the rope-coiling radius to a microfiber elasticity measurement.

* * * * *